(12) United States Patent
Gilchrist, Jr. et al.

(10) Patent No.: US 6,292,627 B1
(45) Date of Patent: Sep. 18, 2001

(54) ELECTRICAL HEATING OF PIPELINES WITH PIPE-IN-PIPE AND MID-LINE CONNECTOR

(75) Inventors: Robert T. Gilchrist, Jr., Westcliffe, CO (US); Ronald M. Bass, Houston, TX (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/679,085

(22) Filed: Oct. 4, 2000

Related U.S. Application Data

(63) Continuation-in-part of application No. 08/921,737, filed on Aug. 27, 1997, now Pat. No. 6,142,707, which is a continuation of application No. 08/625,432, filed on Mar. 26, 1996, now abandoned.

(51) Int. Cl.$^7$ ................. H05B 3/60; F16L 53/00
(52) U.S. Cl. ............................ 392/311; 392/469
(58) Field of Search .................... 392/465, 468, 392/469, 311, 314, 321

(56) References Cited

U.S. PATENT DOCUMENTS

| | | | |
|---|---|---|---|
| 3,983,360 | * | 9/1976 | Offermann ............ 392/469 |
| 4,142,093 | * | 2/1979 | Offermann ............ 392/469 |
| 6,049,657 | | 4/2000 | Sumner ................ 392/469 |
| 6,142,707 | * | 11/2000 | Bass et al. ............ 405/158 |

FOREIGN PATENT DOCUMENTS

2084284-A * 4/1982 (GB) ................ F16L/53/00

OTHER PUBLICATIONS

U.S. application No. 08/921,737, filed Aug. 11, 1999, pending.
"Direct Impedance Heating of Deepwater Flowlines," OTC 11037, May, 1999.

* cited by examiner

Primary Examiner—Teresa Walberg
Assistant Examiner—Thor Campbell

(57) ABSTRACT

Apparatus and method for electrically heating a segment of a subsea pipeline are provided. Electrical power may be supplied about midpoint between the ends of concentric pipes. The annulus between the pipes electrically isolates the pipes, but at the ends of the segment the concentric pipes are electrically connected. The pipes may be electrically connected by bulkheads or by an insulating joint. A toroidal transformer may be placed in the annulus for extracting power at a selected location along the pipeline. An insulating joint allows power to be extracted from the ends of the heated segment. Extracted power may be used for pumps, other devices or for heating jumpers or other short segments of the pipeline. Contiguous segments of a pipeline may be heated, each segment having an electrical connection to the inner and the outer pipe intermediate the ends of the segment. A riser or segment of a riser having a pipe-in-pipe configuration may also be heated.

27 Claims, 3 Drawing Sheets

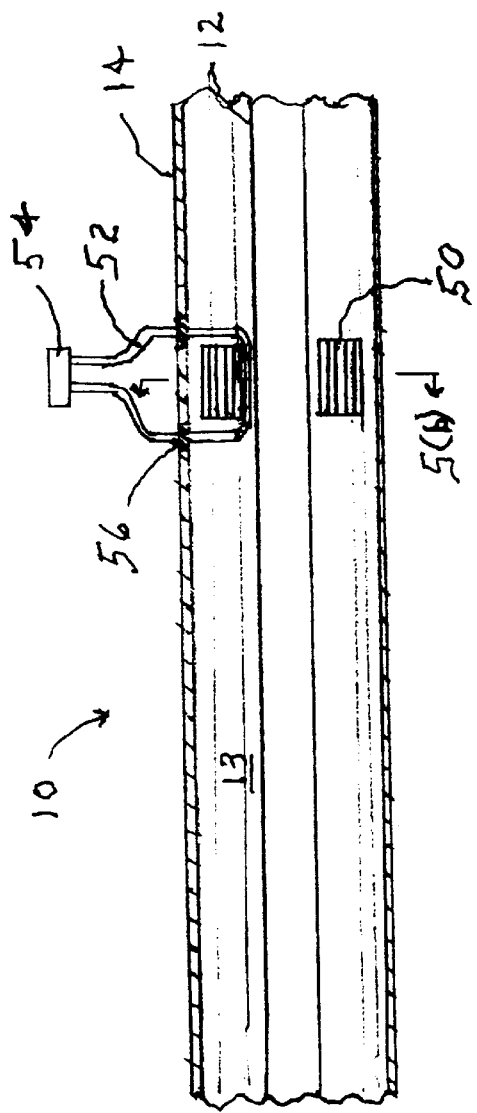
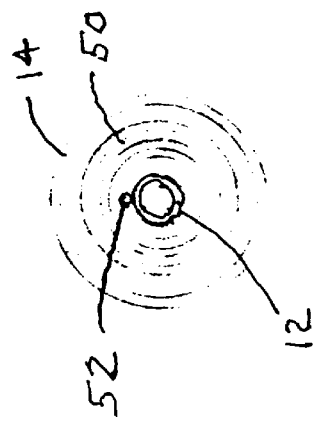
FIG. 5a
FIG. 5b

ELECTRICAL HEATING OF PIPELINES WITH PIPE-IN-PIPE AND MID-LINE CONNECTOR

This application is a continuation in part of Ser. No. 08/921,737, filed Aug. 27, 1997 now U.S. Pat. No. 6,142, 707, which is a continuation of Ser. No. 08/625,432, filed Mar. 26, 1996, now abandoned.

BACKGROUND OF THE INVENTION

1. Field of the Invention

The present invention relates to electrical heating of subsea pipelines. More particularly the invention relates to electrical heating with a pipe-inside-pipe configuration and a connector to the pipes about midway between bulkheads at each end.

2. Description of Related Art

Offshore hydrocarbon recovery operations are increasingly moving into deeper water and more remote locations. Often satellite wells are completed at the sea floor and are tied to remote platforms or other facilities through extended subsea pipelines. Some of these pipelines extend through water that is thousands of feet deep and where temperatures of the water near the sea floor are in the range of 40° F. The hydrocarbon fluids, usually produced along with some water, reach the sea floor at much higher temperatures, characteristic of depths thousands of feet below the sea floor. When the hydrocarbon fluids and any water present begin to cool, phenomena occur that may significantly affect flow of the fluids through the pipelines. Some crude oils become very viscous or deposit paraffin when the temperature of the oil drops, making the oil practically not flowable. Hydrocarbon gas under pressure combines with water at reduced temperatures to form a solid material, called a "hydrate." Hydrates can plug pipelines and the plugs are very difficult to remove. In deep water, conventional methods of depressuring the flow line to remove a hydrate plug may not be effective. Higher pressures in the line and uneven sea floor topography require excessive time and may create more operational problems and be costly in terms of lost production.

The problem of lower temperatures in subsea pipelines has been addressed by placing thermal insulation on the lines, but the length of some pipelines makes thermal insulation alone ineffective. Increased flow rate through the lines also helps to minimize temperature loss of the fluids, but flow rate varies and is determined by other factors. Problems of heat loss from a pipeline increase late in the life of a hydrocarbon reservoir because production rates often decline at that time. Problems become particularly acute when a pipeline must be shut-in for an extended period of time. This may occur, for example, because of work on the wells or on facilities receiving fluids from the pipeline. The cost of thermal insulation alone to prevent excessive cooling of the lines becomes prohibitive under these conditions.

Heating of pipelines by bundling the lines with a separate pipeline that can be heated by circulation of hot fluids has been long practiced in the industry. Also, heating by a variety of electrical methods has been known. Most of the proposals for electrical heating of pipelines have related to pipelines on land, but in recent years industry has investigated a variety of methods for electrical heating of subsea pipelines. ("Direct Impedance Heating of Deepwater Flowlines," OTC 11037, May, 1999)

Two configurations for electrical heating have been considered. In one configuration, a single flowline is electrically insulated and current flows along the flowline. This is called the "SHIP" system (Single Heated Insulated Pipe). Two SHIP systems have been considered: the fully insulated system, requiring complete electrical insulation of the flowline from the seawater, and the earthed-current system, requiring electrical connection with the seawater through anodes or other means. For both systems, current is passed through the flowline pipe. A fully insulated method of electrically heating a pipeline is disclosed in U.S. Pat. No. 6,049,657. In this method, an electrically insulated coating covers a single pipeline carrying fluids from a well. An alternating current is fed to one end of the pipeline through a first insulating joint near the source of electrical current and the current is grounded to seawater at the opposite end of the pipe to be heated through a second insulating joint.

In the second configuration for electrical heating, a pipe-in-pipe subsea pipeline is provided by which a flow line for transporting well fluids is the inner pipe and it is surrounded concentrically by and electrically insulated from an electrically conductive outer pipe until the two pipes are electrically connected at one end. Voltage is applied between the inner and outer pipes at the opposite end and electrical current flows along the exterior surface of the inner pipe and along the interior surface of the outer pipe. This pipe-in-pipe method of heating is disclosed, for example, in Ser. No. 08/921,737, filed Aug. 11, 1999, which is commonly assigned and hereby incorporated by reference herein.

The pipe-in-pipe method of heating disclosed in the referenced patent application requires that the total voltage drop be maintained at the power supply-end of the pipe segment to be heated. The voltage drop at the power input end of a heated segment determines the amount of heating available and the length of a segment that can be heated. Voltage drop is limited by the dielectric strength and thickness of electrical insulation available. A configuration for minimizing voltage required with the pipe-in-pipe method is needed. Also, there is need for apparatus and method that allow heating selected segments of a pipeline that is heated by the pipe-in-pipe method. Capability for withdrawing electrical power from the ends of a heated segment is also needed.

SUMMARY OF THE INVENTION

Toward providing these and other advantages, apparatus and method are provided for enhancing the flow of fluids through a subsea pipeline by heating a segment of the pipeline using the pipe-in-pipe method by applying electrical voltage and withdrawing electrical current through electrical connections to the inner and the outer pipes at an intermediate point between the ends of the segment. Bulkheads between the inner and outer pipes may be used to electrically connect the pipes. In another embodiment one or both bulkheads may be replaced with a connector that makes possible withdrawal of power from one or both ends of the segment to be heated. In another embodiment electrical power is withdrawn from a selected location along the heated pipeline by placing a toroidal transformer in the annulus. The power supply may be a conventional electrical generator supplying alternating current or a direct current source. The electrical current is input through an electrical connection on the inner pipe, flows axially along the metal wall of the inner pipe, through a bulkhead at the remote ends of the segment to be heated, and returns to an electrical connection on the outer pipe. Multiple heated segments of the pipe-in-pipe configuration may be used—either contiguous or discontinuous. A riser having a pipe-in-pipe configuration may be heated as a segment of the pipeline.

DESCRIPTION OF THE DRAWINGS

For a more complete understanding of the invention and the advantages thereof, reference is now made to the following description taken in conjunction with the following drawings in which like reference numbers indicate like features and wherein:

FIG. 5(a) is a cross-sectional view and

FIG. 5(b) is a view of section (bb) of a toroidal transformer in the annulus for withdrawing power at a selected location along the pipeline.

DETAILED DESCRIPTION

Figure 1:
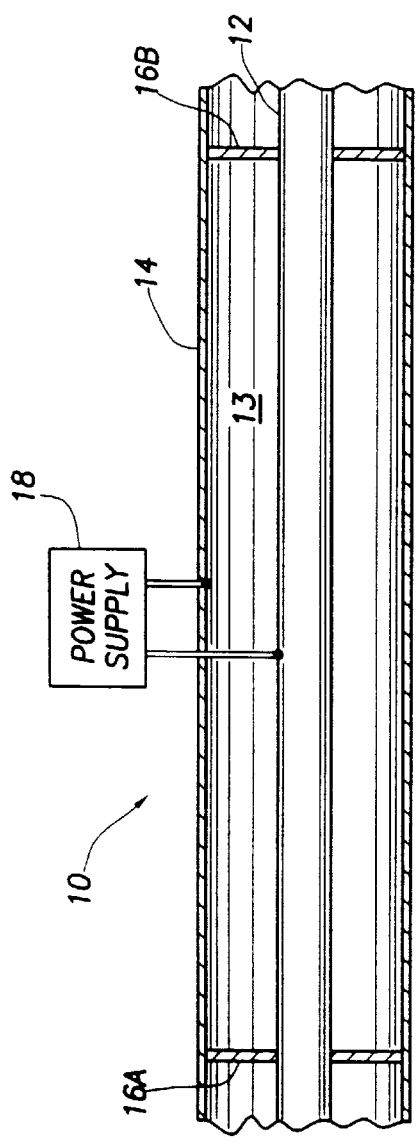
FIG. 1 is a cross sectional sketch of a pipe-in-pipe configuration for direct heating of a pipeline wherein the current enters at about the mid-point of the line and passes in opposite directions to the first and second ends of the segment to be heated.

Referring to FIG. 1, the general concept of heating segment 10 of a pipeline using a pipe-in-pipe system with a mid-line electrical connector is shown. Flowline 12 is surrounded by outer pipe 14, forming annulus 13. Concentric pipes 12 and 14 are electrically isolated except at bulkheads 16A and 16B, which are placed at each end of the selected segment of pipeline to be heated. Electrical power supply 18 supplies voltage at a selected voltage and frequency (including Direct Current) between inner pipe 12 and outer pipe 14 at a selected point on the pipes. In one embodiment, the electrical voltage is supplied at a point approximately at the mid-point between bulkheads 16. In other embodiments, voltage may be supplied at a location offset from the mid-point between bulkheads 16, such that a difference in electrical impedance between each portion of the segment to be heated is taken into account (for example, to allow equal current flow in each portion of the heated segment, even though impedance is different) or to provide more power for heating in one portion of the selected segment. In all these embodiments, the connector between bulkheads will be referred to as a "mid-line" connector. Adjoining selected segments may be heated by the apparatus and method illustrated in FIG. 1. Bulkhead 16A, illustrated on the left in FIG. 1, may be the bulkhead at the opposite end of a second selected segment to be heated, such that electrical current from both segments passes through a single bulkhead. The length of a selected segment to be heated may be from a few feet, for example about 50 feet, to 40 miles or more, depending on the requirements for heating the pipeline. More typically, the length of the segments to be heated will be in the range from about 1 to about 10 miles.

Figure 2B:
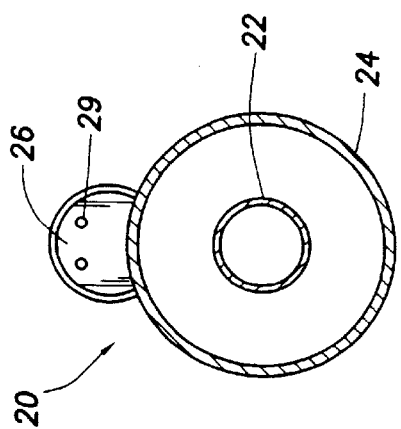
FIG. 2(b) is an end view of a mid-line connector for a pipe-in-pipe configuration for electrical heating.
Figure 2A:
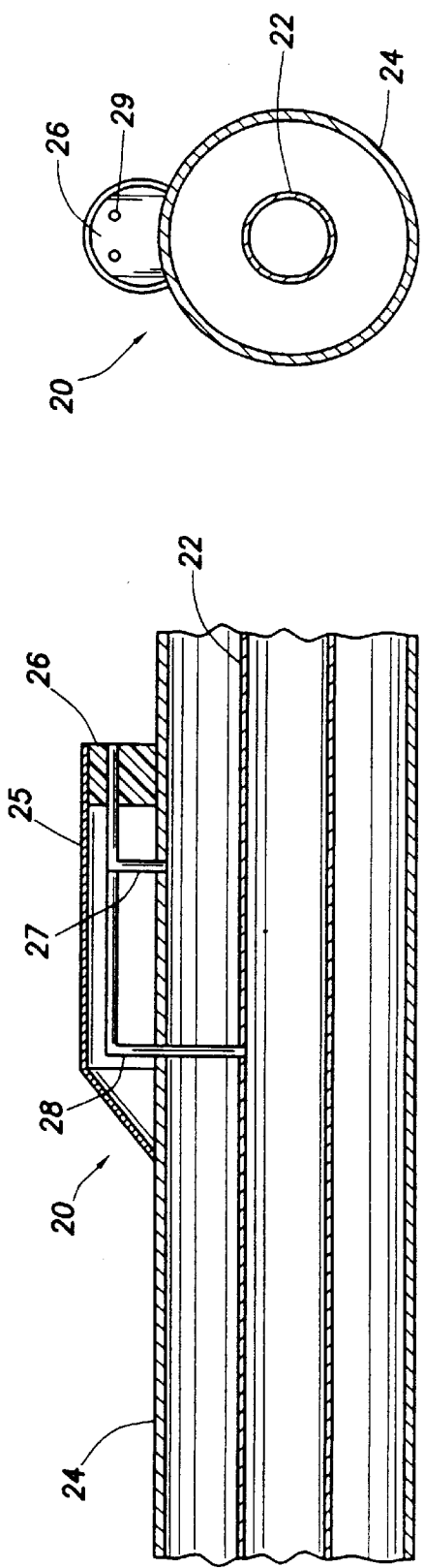
FIG. 2(a) is a cross sectional view.

FIG. 2 illustrates in more detail the mid-line connector, shown generally at 20. Inside pipe 22 is adapted to join to the inside pipe of a pipe-in-pipe configuration pipeline and is electrically insulated from outside pipe 24. Outside pipe 24 is adapted to join to the outside pipe of a pipe-in-pipe configuration pipeline. Housing 25 contains electrical connector 26 and conductors 27 and 28 attached to the outside and inside pipes. FIG. 2(b) shows contacts 29 in connector 26. Connector 26 may be part of a wet-mateable assembly, in which case an electrical cable having the matching part to connector 26 may be attached to connector 26 while the connector is under water, as is well known. Wet-mateable connectors are available, for example, from Tronic Ltd. of Cumbria, England. Alternatively, a dry connection may be made to connector 26 before a pipeline is placed under water and the first end of a cable may be attached to connector 26 with a wet-mateable connector attached to the second end of the cable.

It is necessary that inner pipe 12 (FIG. 1) be electrically isolated from outer pipe 14 along the entire segment 10 of the pipe-in-pipe pipeline to be heated, except at the bulkheads where the pipes are connected. Direct contact may be prevented using a plurality of electrically insulated centralizers spaced at frequent intervals along the annulus between the pipes. It may also be desirable to take steps to prevent arcing and other electrical discharges across the annulus. These steps may include careful quality control measures to prevent water and debris from entering the annulus, removing any sharp points or edges protruding into the annulus and providing an arc resistant coating on the outside of inner pipe, steps that are more particularly described in copending and commonly assigned application Ser. No. 08/921,737, filed Aug. 11, 1999, which is hereby incorporated by reference herein.

It is also useful to remove water from the annulus. This may be accomplished by forcing dry air or dry nitrogen through the annulus, or alternatively, by evacuating the annulus with a vacuum pump to remove air and water vapor. Once evacuated the annulus may be maintained under vacuum as part of a thermal insulation program or as part of a leak detection program. Alternatively, after evacuating the annulus, arc suppressing gas such as sulfur hexafluoride may be injected into the annulus. Direct conductive heat transfer across the annulus is preferably limited by selecting materials for centralizers that are thermally insulative as well as electrically insulative and by properly selecting the centralizer length and spacing between the centralizers. Other methods for reducing heat loss may be used, as more fully explained in application Ser. No. 08/921,737.

Figure 3:
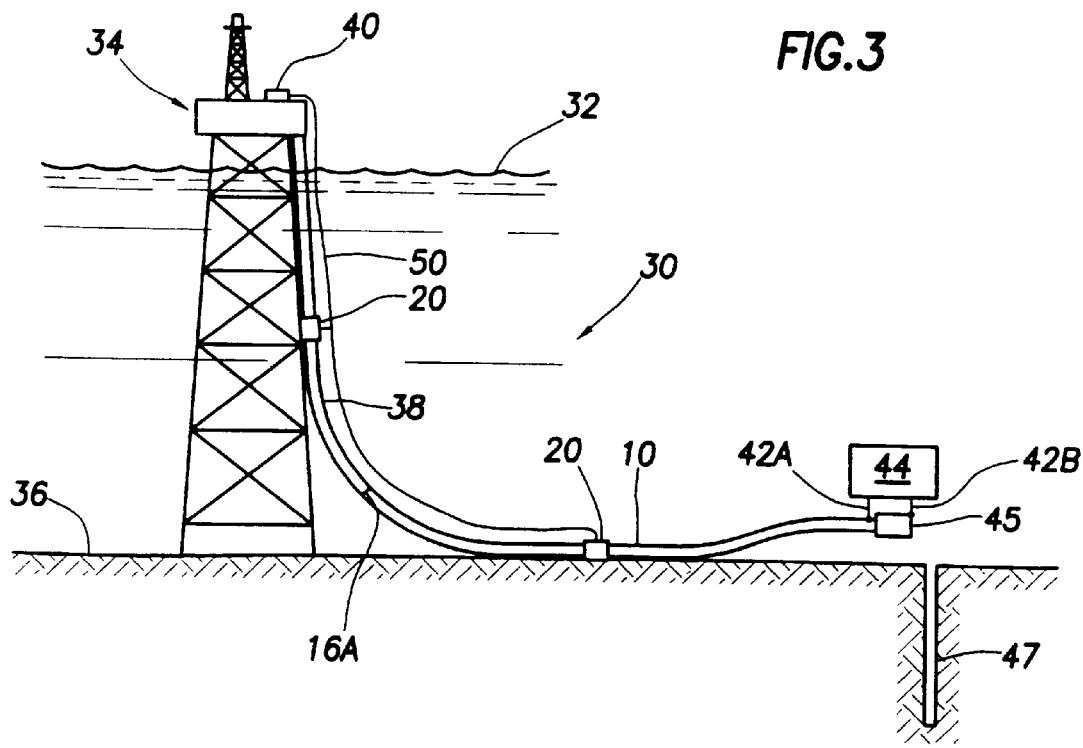
FIG. 3 is a view of apparatus for heating a riser and a segment of pipe-in-pipe near an offshore platform.

FIG. 3 illustrates the application of a mid-line pipe-in-pipe electrically heated system, shown generally at 30. The pipeline is deployed normally thousands of feet below sea level 32 and terminates at a first end near platform 34, a floating facility or other host facility. Platform 34 may be anchored to sea floor 36. Riser 38 may connect heated segment 10 to the top side of a platform or other facility. Riser 38 may also be heated using the pipe-in-pipe configuration, in which case it will be treated as a segment 10 of the pipeline. Among the equipment supported on platform 34 is electrical generator 40. Electrical generator 40 is connected electrically by cable 50 to midline connectors 20. Cable 50 will normally contain two conductors for each midline connector, as indicated in FIG. 2(b). Connector 20 is placed at a selected location, normally about midway between two electrically conductive bulkheads at the end of segment 10 of a pipe-in-pipe pipeline or riser that is to be heated, such as bulkheads 16A (shown in FIG. 3) and 16B of FIG. 1. Alternatively, one or both bulkheads may be replaced by insulating joint 45, which is shown in more detail in FIG. 4. Insulating joint 45 can be used in some operating conditions, where shorting is not as likely, as shown in FIG. 3 to extract electrical power at the end of segment 10. Electrical conductor 42A is attached to the outside pipe of segment 10 and conductor 42B is attached to insulating joint 45. This allows taking current between the inside and outside pipe, and this current can to be used to operate electrical device 44, which may be a pump that may be used to pump fluids from well 47. Insulating joint 45 also serves to isolate heated segment 10 from any adjacent segment of pipeline (not shown).

Alternatively, electrical power may be extracted from a selected location along a segment 10 of the pipeline by use of a toroidal transformer, such as illustrated in FIGS. 5(a) and 5(b). Referring to FIG. 5(a), core 50 of the toroidal transformer is adapted to fit in annulus 13 with clearance between inside pipe 12 and core 50. Wire 52 is looped around core 50 a selected number of turns. Wire 52 may terminate in a part 54 of a wet-mateable connector. Insulators 56 electrically isolate wire 52 from outside pipe 14. Cross-section (b—b) of FIG. 5(a) is shown in FIG. 5(b). A second part of a wet-mateable connector may by used with part 54 to obtain electrical power from flow of current along inner pipe 12.

The thickness of core 50 is limited by the space available in annulus 13. Annulus 13 may be enlarged over the length of the core 50 to allow a thicker core 50. Core 50 is laminated in the radial direction to prevent excessive eddy current losses. Laminations must be thin to allow for the skin effect. The preferred thickness depends on choice of core material and frequency, but in some cases will be in the range of conventional lamination thicknesses for 60 Hz power applications, which are in the range of about 9–14 mils. The core may be formed from laminations of steel. Alternatively, a ferrite core may be used. The cross-sectional area and therefore the volume of the transformer needed is proportional to the voltage required for the extracted power. As an example of a toroidal transformer, assume the thickness of the core in an annulus is 1 inch. The number of laminations is 1 inch divided by the lamination thickness. The magnetic permeability of the steel is chosen to run the core at about the saturation flux. A permeability of approximately 1,500 times the permeability of free space is compatible with a current of about 270 amperes in a pipe of 6.625 inches in diameter. Assuming a core length of 0.5 meter and one turn of cable, a voltage of about 4 volts will be produced at a frequency of 60 Hz. The voltage is proportional to the core length and number of turns. If the transformer is used to extract power from the pipe, the power provided is equal to (volts/turn)×(pipe current), which in the example would be 4×270=1080 watts. This is enough power to heat a typical insulated pipeline jumper that is about 50 to 100 feet in length to a temperature that is typically sufficient to melt gas hydrates.

The voltage developed is proportional to core cross-sectional area, so the core length may be shortened in approximately the same proportion as core thickness is increased, so long as the core is not saturated. Because magnetic field falls off in proportion to distance from the center of the pipe, if thickness is doubled a somewhat longer core than 0.5 times original length is required.

Midline connector 20 may be optimally placed at some location other than mid-line between bulkheads if additional heating is required between the connector and a bulkhead at an end of segment 10. For example, if additional current and additional heating were required in one direction from connector 20 to bulkhead 16A, connector 20 may be moved in the direction toward bulkhead 16A. This may be desirable, for example, if wax or hydrate problems are expected to be greater in the portion of the pipeline between connector 20 and bulkhead 16A. Alternatively, connector 20 may be optimally located to account for differences in pipe impedance in different portions of segment 10. Impedance may be measured in portions of the segment and the data used to select the location of connector 20. The location may be selected to apply equal power to each portion of the segment, for example. When the segment to be heated is a riser, connector 20 may be offset from the midpoint of the segment to avoid placing the connector in an area of high dynamic stress on the riser.

Figure 4:
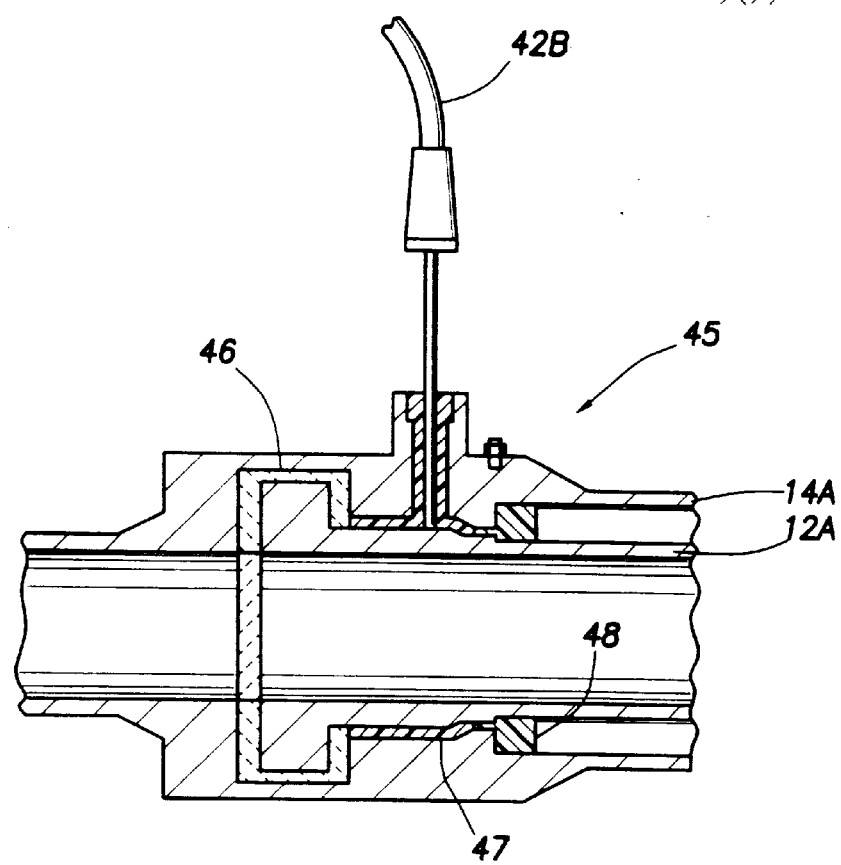
FIG. 4 is a partial cross-section of an insulating joint.

FIG. 4 shows a design of an insulating joint, shown generally at 45, such as shown at 45 in FIG. 3. Ceramic insulators 46 and silicone insulation 47, held in place by plugs 48, may be used to electrically isolate inside pipe 12 and outside pipe 14 and an adjoining segment of pipeline, if present.

Contiguous segments of a pipeline such as segment 10 (FIG. 3) may be heated independently. A mid-line connector such as connector 20 will then be placed in each segment. Bulkheads such as bulkhead 16A may receive electrical current from adjoining segments during heating of each segment. By supplying electrical current to a mid-line connector in each segment of a pipeline system that is to be heated, flexibility in heating the system is greatly increased. Heat can be supplied to that portion of the pipeline that is to be heated at any time. Cable 50 (FIG. 3) with a wet-mateable connector attached may be transferred from segment 10 to another segment in the pipeline that is to be heated.

For the same value of electrical current, the voltage between mid-line connector 20 and bulkheads such as 16A will be approximately half what it would be with the current entering one end of segment 10. Therefore, requirements for electrical insulation are decreased significantly by use of a mid-line connector in a segment to be heated. With the mid-line connector it is not necessary to break the inner pipe electrically or isolate various segments of the inner pipe or flowline.

While particular preferred embodiments of the present invention have been described, it is not intended that these details should be regarded as limitations on the present invention, except to the extent that they are included in the following claims.

What is claimed is:

1. Apparatus for electrically heating a first segment of a subsea pipeline, the first segment having a first end and a second end, comprising:
   an inner pipe and an outer concentric pipe forming an annulus in the segment to be heated;
   electrical connections between the inner and the outer concentric pipe at the first and second ends of the segment; and
   electrical connections to the inner and to the outer concentric pipe, the electrical connections each being disposed at a selected location intermediate the first and second ends.

2. The apparatus of claim 1 further comprising electrically insulative centralizers in the annulus.

3. The apparatus of claim 1 wherein the electrical connections between the inner and the outer concentric pipe at the first and second ends of the segment are bulkheads.

4. The apparatus of claim 1 wherein the electrical connection between the inner and the outer concentric pipe at the first end or both the first and second ends of the segment includes an insulating joint such that electrical power can be obtained at the end of the segment.

5. The apparatus of claim 1 wherein the selected location of the electrical connections to the inner and the concentric outer pipe is approximately at the midpoint between the first and second ends.

6. The apparatus of claim 1 wherein the selected location of the electrical connections to the inner and the concentric outer pipe is offset from the midpoint between the first and second end.

7. The apparatus of claim 1 wherein the electrical connections to the inner and outer concentric pipes are adapted to be joined to a power source by a wet-mateable connector.

8. The apparatus of claim 1 further comprising an electrical generator and a cable for connecting the generator to the electrical connections to the inner and outer concentric pipes.

9. The apparatus of claim 1 wherein the first segment is a riser.

10. The apparatus of claim 1 further comprising a toroidal transformer at a selected location in the annulus and an electrical conductor for extracting power through the outer concentric pipe.

11. The apparatus of claim 10 wherein the toroidal transformer comprises a core made from laminations of steel.

12. A method for electrically heating a segment of a subsea pipeline, comprising:

providing an inner pipe and an outer concentric pipe forming an annulus between a first end and a second end of the segment to be heated;

providing electrical connections between the inner and the outer concentric pipe at the first and second ends of the segment;

providing an electrical connection to the inner and to the outer concentric pipe at a selected location intermediate the first and second ends; and supplying a selected voltage and power to the inner and the outer concentric pipe so as to heat the segment.

13. The method of claim 12 wherein the electrical connections provided between the inner and the outer concentric pipe at the first and second ends are bulkheads.

14. The method of claim 12 wherein the electrical connection provided between the inner and the outer concentric pipe at the first end or the second end of the segment is an insulating joint and further comprising the step of extracting electrical power at the first or second end of the segment.

15. The method of claim 14 wherein the electrical power is extracted and used to power a device.

16. The method of claim 14 wherein the electrical power is extracted and used to drive a pump for pumping fluids from a well.

17. The method of claim 14 wherein the electrical power is extracted and used to heat a second segment of a pipeline system.

18. The method of claim 12 wherein each of the electrical connections to the inner and the outer concentric pipe is placed at approximately the midpoint between the first and second ends.

19. The method of claim 12 wherein the electrical connection to the inner or to the outer concentric pipe is placed so as to be offset from the midpoint between the first and second ends.

20. The method of claim 12 further comprising the step of determining the electrical impedance from the midpoint to the first end and the second end of the segment and placing the electrical connection to the inner or to the outer concentric pipe between the first and second end so as to minimize the differences in electrical current through the first end and the second end.

21. The method of claim 12 wherein supplying electrical power to the inner and the outer concentric pipe includes supplying and using wet-mateable connectors so as to apply voltage between the inner and the outer concentric pipe.

22. The method of claim 21 further comprising the step of disconnecting the wet-mateable connectors in the segment.

23. The method of claim 12 wherein the segment is a riser.

24. The method of claim 12 further comprising the step of placing a toroidal transformer in the annulus and providing electrical connections to remove power to outside the outer concentric pipe.

25. The method of claim 24 wherein the electrical power is used to power a device.

26. The method of claim 24 wherein the electrical power is used to drive a pump for pumping fluids from a well.

27. The method of claim 24 wherein the electrical power is extracted and used to heat a second segment of a pipeline system.

* * * * *